Jan. 5, 1954
H. R. ELLIOTT
2,664,771
NUT HOLDER WITH RESILIENT LEGS
Filed June 28, 1949
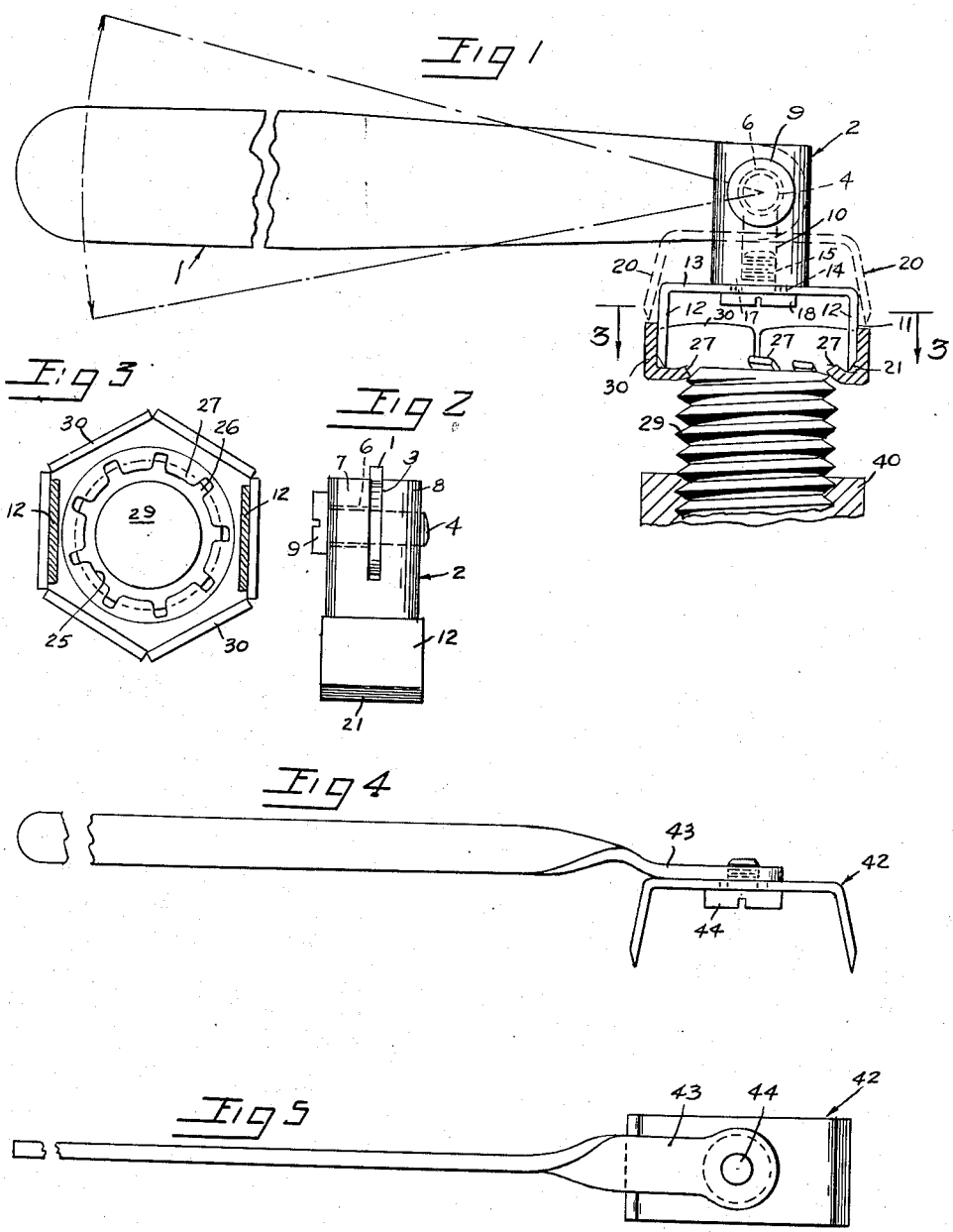
INVENTOR.
HOWARD R. ELLIOTT
BY
Boyken, Mohler + Beckley
ATTORNEYS.

Patented Jan. 5, 1954

2,664,771

UNITED STATES PATENT OFFICE 2,664,771

NUT HOLDER WITH RESILIENT LEGS

Howard R. Elliott, Long Beach, Calif.

Application June 28, 1949, Serial No. 101,729

1 Claim. (Cl. 81—13)

This invention relates to a holder for a peripherally flanged nut of the type generally known in various industries as a "pal" nut.

Nuts of the above character are used extensively in the airplane industry and in other industries, for lock nuts. They are economical, effective, and easily applied, once they are started onto the bolt, but they are very difficult to start onto the bolt thread.

One of the objects of this invention is the provision of simple means that enables the operator to quickly and easily start peripherally flanged lock nuts, such as "pal" nuts, onto the bolt thread.

Another object of the invention is the provision of means for enabling an operator to quickly and easily start nuts onto bolts where the latter are in awkward positions, or in positions where starting the nuts would be relatively difficult with any kind of a nut.

A still further object of the invention is the provision of a holder for peripherally flanged lock nuts that is adapted to be automatically released from the nut upon the nut being threaded onto the bolt.

Other objects and advantages will appear in the description and in the drawings.

In the drawings,

Fig. 1 is an enlarged side elevational view of one form of the invention in position holding a peripherally flanged nut (shown in cross section) in position for starting on a bolt, the latter being a fragment of such bolt indicated in elevation.

Fig. 2 is an end view of the holder of Fig. 1 apart from the nut.

Fig. 3 is a sectional view taken along line 3—3 of Fig. 1.

Fig. 4 is a side elevational view of a slightly different type of holder than is shown in Fig. 1.

Fig. 5 is a top plan view of the holder of Fig. 4.

In detail, the holder of Fig. 1 comprises an elongated handle 1, that is illustrated in the form of a strip of metal or of any other suitable material.

Pivotally secured to one end of said strip is a straight connector element 2, one end of which may be slotted at 3 longitudinally thereof to provide a clevis between the sides of which one end of the handle 1 is adapted to be positioned. A pivot 4 extends through said one end of said handle transversely of the plane thereof and through the opposite sides of the clevis formed by slot 3. This pivot may be in the form of a screw that freely passes through opening 6 in one side 7 of the clevis, and with the outer end of said screw threaded into the other side 8 of said clevis. By tightening the head 9 of said screw against the side 7 of the clevis, any desired frictional resistance may be placed on the end of handle 1. Hence, if desired, the element 2 can be virtually locked in any angular extension from the end of handle 1, or the handle may be held between the sides of the clevis fairly loose at any desired degree of tightness.

Element 2 is formed with an interiorly threaded axially extending central opening 10 in its outer end that extends at right angles to the axis of screw 4.

An inverted generally U-shaped strip 11 of resilient material, such as spring steel, provides a pair of uniform length spring legs 12 connected at one of their ends by a central section 13.

This central section 13 is formed with an opening 14 centrally between its ends, and a screw 15 extends fairly loosely through said opening and is threadedly secured at its outer end in opening 10. This screw is enlarged where it passes through the opening in section 13 to provide a shoulder 17 in engagement with the outer end of element 2. Head 18 of the screw is thus spaced from the said element 2 so as to permit free rotation of strip 11 about the axis of screw 15.

The legs 12 of said strip 11 extend slightly divergently outwardly from their ends that are connected by section 13. Such divergence is indicated in dash lines 20 in Fig. 1 in which the legs are indicated in position before forcing the outer ends of the legs toward each other to enter the nut.

The free ends of legs 11 preferably terminate in straight edges extending at right angles to the length of the strip, and the opposite outer sides of said legs along their free edges are bevelled, as indicated at 21 to facilitate insertion of the legs into a nut, as will later be described.

Peripherally flanged nuts of the type adapted to be held by the holder of this invention, are stamped from sheet metal and each is centrally apertured at 25 (Fig. 3) for the bolt, the marginal portion around said aperture being radially slotted at 26 to provide sections 27 that are free to bend to one side of the plane of said aperture, as seen in Fig. 1, when the nut is threaded onto a bolt 29.

Flanges 30 are around the periphery of the central portion of said nut. Said flanges form the hexagonal sides of the nut.

The width of the U-strip, or the width of legs 11 of said strip, is about the same as the length of each of the flanges 30. The distance between the free divergent outer edges of said legs, when they are free from the nut, is slightly greater than the distance between each of the two opposed sides of the pairs of opposite flanges 30. Upon pressing the outer ends of the legs 12 toward each other slightly, the legs will easily slip into the nut between two of the opposed surfaces of a pair of opposed flanges, and the nut will be firmly, but releasably held by the U-strip as seen in Fig. 1.

When the nut is so held, the operator merely places it on the outer end of bolt 29 with the central opening 25 therein in axial alignment with the bolt, and rotates the bolt in the proper direction by the fingers of one hand while forcing the nut against the bolt by force applied to handle 1. It is to be noted that the sides of strip 1 forming the handle are disposed in the same direction as the force that is applied to the nut, hence the handle will not bend under said force.

When the nut is started onto the bolt, for movement against the nut 40 that is to be locked, the bolt will automatically push the U-member off the nut. The handle may, of course, be merely moved away from the bolt at its outer end so as to to carry the U-strip away from the nut, if desired. However, when the U-strip is forced off by the bolt the operator is certain that the nut is securely on the bolt.

The form of invention shown in Figs. 4, 5 is similar to that of Figs. 1 to 3, except that the U-strip, shown at 42 in Figs. 4, 5, is not adjustable relative to the handle 43. Instead, a shouldered screw 44 directly connects the U-strip 40 to the outer end of handle 43, said screw being the same as screw 15. The U-strip 43 is pivotally held to the handle by screw 44 for rotation about the axis of said screw.

Inasmuch as there are many industries where the adjustable head carrying the U-strip is not needed, the invention as shown in Figs. 4, 5 would be adequate. Also, the invention shown in Fig. 4, 5 is more compact than the invention is shown in Figs. 1 to 3 due to the elimination of the element 2.

I claim:

A holder for a peripherally flanged nut comprising, an elongated handle, an inverted generally U-shaped strip of resilient material providing a pair of substantially opposed legs of the same length connected at one of their ends by a central section of said strip, said legs extending slightly divergently to one side of said section and having their outer ends bevelled on their oppositely outwardly facing sides to facilitate insertion of said legs to a position between and in yieldable engagement with two of the opposed flanges on said nut at two opposite sides of said nut, means securing said strip to one end of said handle including a pivot extending through the center of said section supporting said strip for revolution of said legs transversely of their lengths.

HOWARD R. ELLIOTT.

References Cited in the file of this patent

UNITED STATES PATENTS

| Number | Name | Date |
|---|---|---|
| 1,281,928 | Fifield | Oct. 15, 1918 |
| 1,474,798 | Stark | Nov. 20, 1923 |
| 1,500,831 | Little | July 8, 1924 |
| 1,652,681 | Peterson | Dec. 13, 1927 |
| 1,767,296 | Lewis | June 24, 1930 |

FOREIGN PATENTS

| Number | Country | Date |
|---|---|---|
| 783,913 | France | Apr. 15, 1935 |